United States Patent
Gao

(10) Patent No.: US 6,226,596 B1
(45) Date of Patent: May 1, 2001

(54) METHOD FOR ANALYZING AND CLASSIFYING THREE DIMENSIONAL SEISMIC INFORMATION

(75) Inventor: Dengliang Gao, Houston, TX (US)

(73) Assignee: Marathon Oil Company, Findlay, OH (US)

(*) Notice: Subject to any disclaimer, the term of this patent is extended or adjusted under 35 U.S.C. 154(b) by 0 days.

(21) Appl. No.: 09/429,308

(22) Filed: Oct. 27, 1999

(51) Int. Cl.[7] .................................................. G06F 19/00
(52) U.S. Cl. ............................................. 702/16; 367/73
(58) Field of Search ................................ 702/16; 367/72, 367/73; 703/10; 345/430, 424, 426

(56) References Cited

U.S. PATENT DOCUMENTS 5,966,672 * 10/1999 Knupp ...................................... 702/14
6,011,557 * 1/2000 Keskes et al. ......................... 345/430

* cited by examiner

*Primary Examiner*—Donald E. McElheny, Jr.
(74) *Attorney, Agent, or Firm*—Jack E. Ebel

(57) ABSTRACT

Volume Seismic textures are evaluated using a Voxel Coupling Matrix (VCM) to capture and characterize three dimensional seismic reflection patterns. To extract the VCM seismic textural information at a specific location within the seismic amplitude input data, a finite number of neighboring voxels called a texture element (texel) are processed to create the VCM. The VCM is then processed to create a plurality of texture attributes. This processing is performed at each voxel location throughout the whole seismic data volume to create multiple texture attribute volumes. These attribute volumes are subsequently used as inputs into an attribute-trace classification method to produce a seismic interpretation volume. The interpretation volume is displayed using any number of distinct colors to represent various numbers of classes of reflection patterns present within the seismic volume.

21 Claims, 11 Drawing Sheets

METHOD FOR ANALYZING AND CLASSIFYING THREE DIMENSIONAL SEISMIC INFORMATION

FIELD OF THE INVENTION

This invention relates to Computer Aided Interpretation Systems and more particularly to analysis of graphical data. Even more particularly, the invention relates to analysis of three dimensional seismic data.

BACKGROUND OF THE INVENTION

Since the early 1980's, three dimensional seismic image technology has revolutionized subsurface geologic mapping and hydrocarbon exploration in the petroleum industry. However, interpretation of three dimensional seismic images has been mainly a subjective process involving a human interpreter extracting and discriminating information by visual inspection of reflection patterns. This approach is time consuming, the results depend on individual human interpreters, and the results usually are not repetitive. Also, human interpreters tend to inspect reflection patterns along either the inline or crossline direction but ignore the third dimension. In previous studies, numerous seismic attributes have been used in an attempt to quantify seismic interpretation. However, these attributes are generally based on one trace and depend on an interpreted horizon, or they have been specifically used to enhance certain aspects of seismic data, such as dip, azimuth, and faults, etc. These attributes have certain limitations in the identification and classification of seismic facies, for example, that are characterized by lateral relationships of amplitude in different orientations and from different perspectives.

Little has been published on quantitative seismic pattern recognition and hydrocarbon indicator detection in three dimension s using volume-based and horizon-independent seismic technology. Although image textures have been used in conventional two dimensional image processing, such as photographs, Landsat, and side-scan sonar images, etc., little attempt has been made to quantitatively analyze three dimensional seismic interpretation and hydrocarbon exploration data. Since seismic images differ fundamentally from other images in that seismic images consist of vertical traces with alternating peak and trough amplitudes, and the traces are aligned laterally in an orderly manner to form characteristic stratal nature of reflection events, a different approach is required to capture and process both stratigraphic and structural information in the subsurface out of the seismic volume. Although several authors have applied the texture concept to reflection seismic interpretation in recent years, textures have usually been extracted in two dimensions, which significantly limits their reliability and resolution.

Manipulating multiple attributes effectively is an important next process after numerous attributes have been extracted. Conventionally, false-color (RGB) mapping, principal component analysis (PCA), clustering, and supervised classification have been commonly used to reduce the dimensionality of attributes and to display multiple attributes. Such processes use human interpreters, and since interpreters generally have little idea about the clustering structure of attributes in multiple dimensions, they must subjectively determine the number of classes to be grouped before classification. That may lead to a classification volume in which two different classes may be grouped into one class, or one actual class is split into two or more different classes. Generally, human interpreters have little control and may not realize that misclassification occurred until they learn the actual facies classes in the data volume by running different sessions of classification using different numbers of classes.

Combining multiple textural attributes helps minimize the non-uniqueness in seismic pattern recognition and classification. However, generalizing and interpreting numerous attributes are generally difficult, which is particulary true with a large number of attributes. Previously, various attempts have been made to condense and visualize multiple attribute data sets. For example, false-color imaging technology has been used to accommodate three attributes at a time by forming one RGB false-color image. Principle Components Analysis (PCA) has been performed to reduce the data dimensionality. In addition, various classification algorithms (e.g., clustering/unsupervised, NNT, and supervised classifiers) have been commonly used to reduce multiple attribute volumes into one final thematic volume that consists of discrete categories (classes) based on their closeness in multiple attribute space. However, with increasing number of seismic attributes and the size of attribute volumes, computational efficiency becomes an important issue in multi-attribute classification process. Besides, resolution and reliability of these conventional classification technology depend on user-specified class number. In this context, the attribute-trace concept proposed here provides a new solution to improve the efficiency, resolution, and reliability for multi-attribute classification and interpretation.

It is thus apparent that there is a need in the art for an improved method of analyzing three dimensional seismic data. The present invention meets these and other needs.

SUMMARY OF THE INVENTION

It is an aspect of the present invention to analyze three dimensional seismic data.

It is another aspect of the invention to transform seismic amplitude data into seismic texture attribute data.

Another aspect of the invention is to define a volume texture element (texel) around each voxel of the three dimensional seismic data.

Another aspect of the invention is to create a Voxel Coupling Matrix (VCM) from the three dimensional seismic data, and to transform the VCM into a plurality of texture attributes.

A further aspect of the invention is to transform the texture attributes into an interpretation (thematic) volume using an attribute-trace classification method.

The above and other aspects of the invention are accomplished in a system that first optimizes the seismic amplitude data and then defines an evaluation window, called a texel, to be used in selecting data. The texel has both a size and a geometry, and is used to select data to be converted from the three dimensional input seismic amplitude data into a VCM. Once texel size and geometry is selected, the input data is evaluated voxel by voxel to create the output VCM. The VCM data is then processed to create several texture attributes, such as homogeneity, contrast and randomness as well as others. The covariance of attributes are evaluated to select the least correlated and these are then combined using an attribute-trace method to produce an interpretation volume, which is then displayed.

BRIEF DESCRIPTION OF THE DRAWINGS

The above and other aspects, features, and advantages of the invention will be better understood by reading the following more particular description of the invention, presented in conjunction with the following drawings, wherein.

DESCRIPTION OF THE PREFERRED EMBODIMENT

The following description is of the best presently contemplated mode of carrying out the present invention. This description is not to be taken in a limiting sense but is made merely for the purpose of describing the general principles of the invention. The scope of the invention should be determined by referencing the appended claims.

Figure 1:
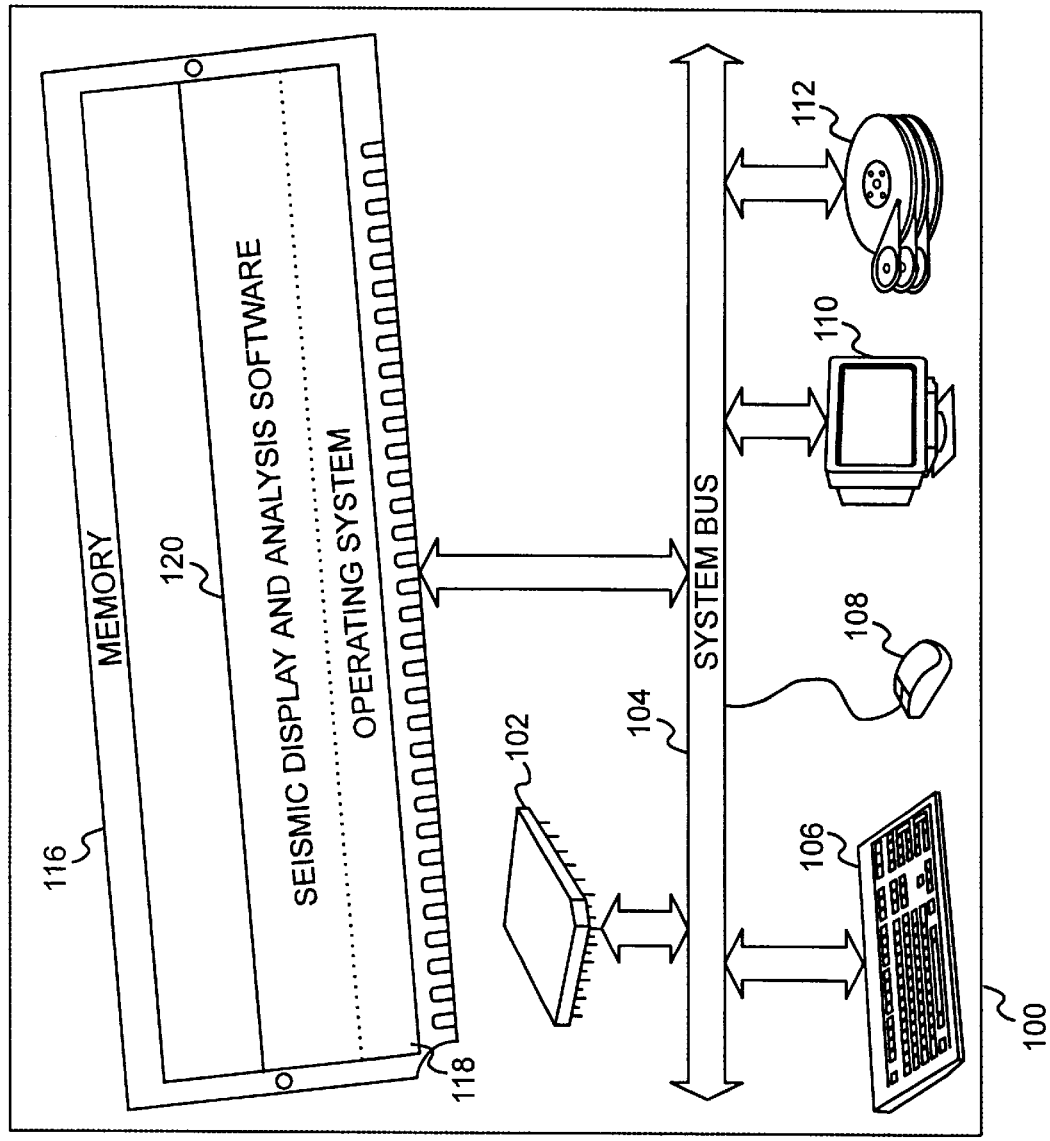
FIG. 1 shows a block diagram of a computer system incorporating the present invention.

FIG. 1 shows a block diagram of a computer system incorporating the seismic display and analysis software of the present invention. Referring to FIG. 1, a computer system 100 contains a processor 102 that communicates to other elements of the computer system 100 over a system bus 104. A keyboard 106 allows a user of the computer system 100 to enter command lines, and a graphical selection device 108 allows the user to select seismic data and computer programs of the present invention via an Application Program Interface (API). A display device 110 allows software within the computer system 100 to display seismic, textual and other graphical information to the user. A storage device 112 stores the software and seismic data used within the computer system 100.

A memory 116 contains an operating system 118, which is typically the Microsoft® Windows operating system or the Unix® operating system. Seismic display and analysis software 120, of the present invention, analyzes seismic data retrieved from the storage device 112 and displays the results on the display device 112, all in response to commands entered by the user using the keyboard 106 or the graphical input device 108.

Figure 2:
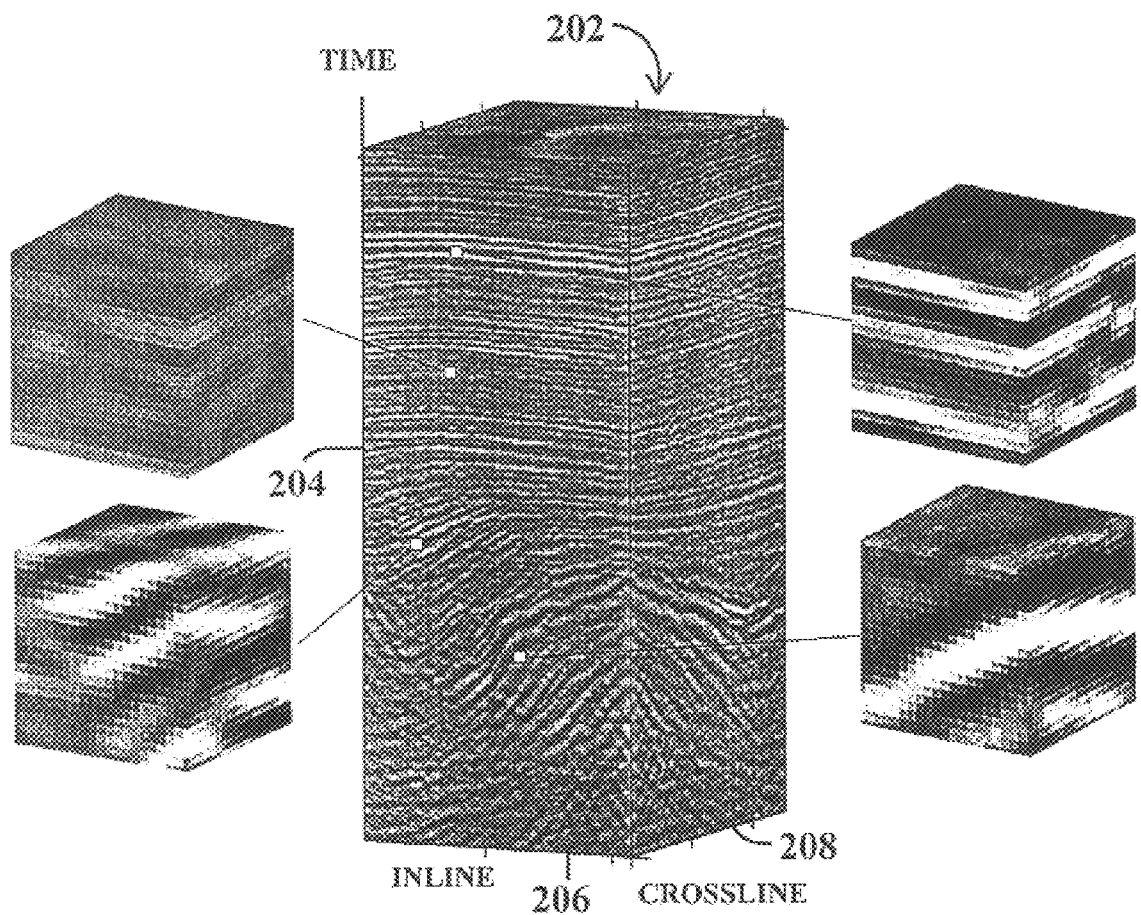
FIG. 2 shows an example of prior art seismic data used as input to the seismic display and analysis software of the present invention.

FIG. 2 shows an example of prior art seismic data used as input to the seismic display and analysis software of the present invention. Referring to FIG. 2, graph 202 shows seismic data as conventionally displayed with a time line 204 as the vertical axis, and inline 206 and crossline 208 the horizontal axes.

Three dimensional seismic images comprise vertical traces, which are a vertical array of voxels, wherein a voxel is a single data point. Each trace has alternating peak and trough amplitudes, which are aligned laterally to form a coherent stratal nature. This stratal nature of seismic images lends themselves to a special technology to characterize their intrinsic features or patterns, as will be described below.

Figure 3A:
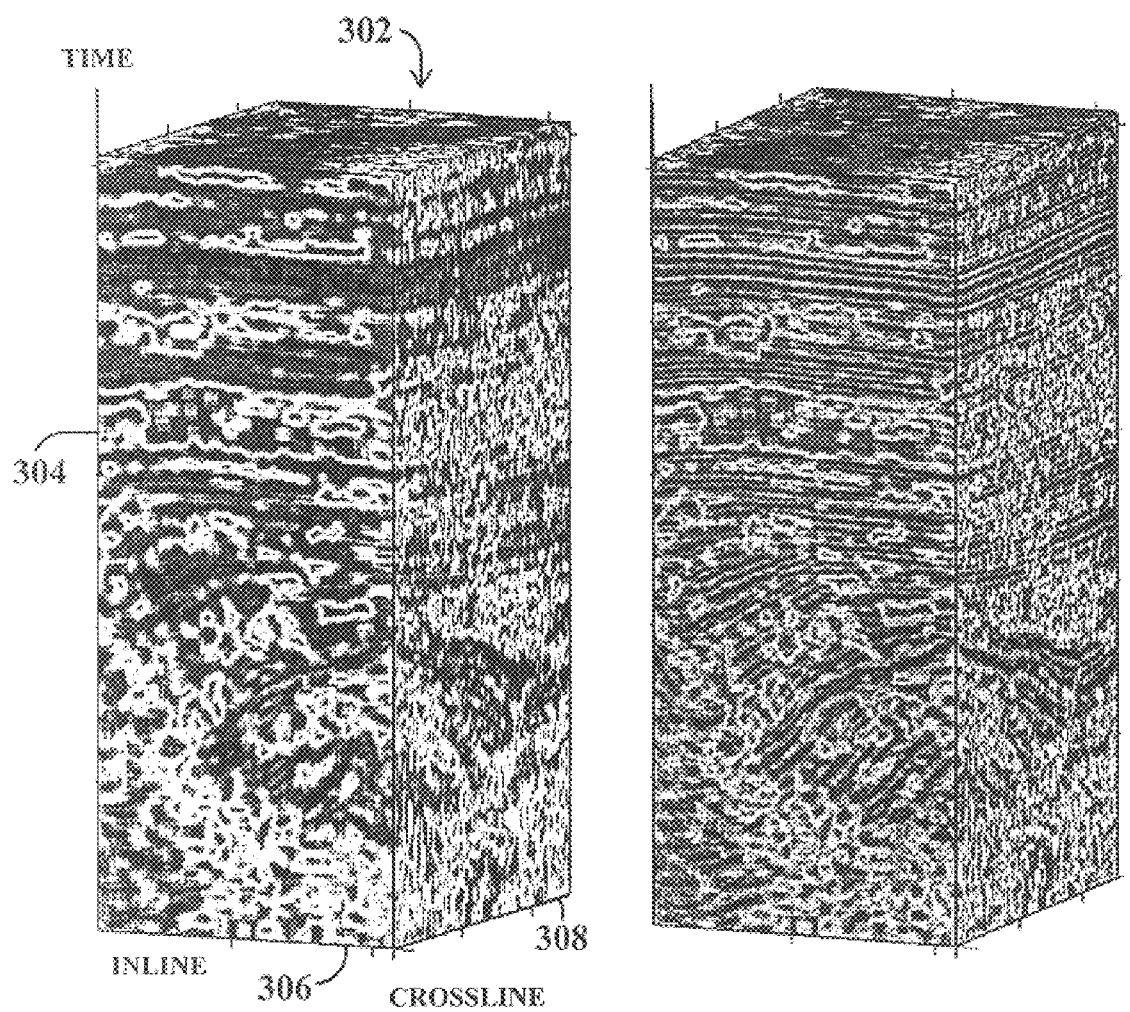
FIG. 3A shows an example of a homogeneity texture attribute volume wherein the left image is the data volume produced by the present invention and the right image is the overlay between the data volume of the left image and the input amplitude volume used to produce the data volume of the left image.
Figure 3B:
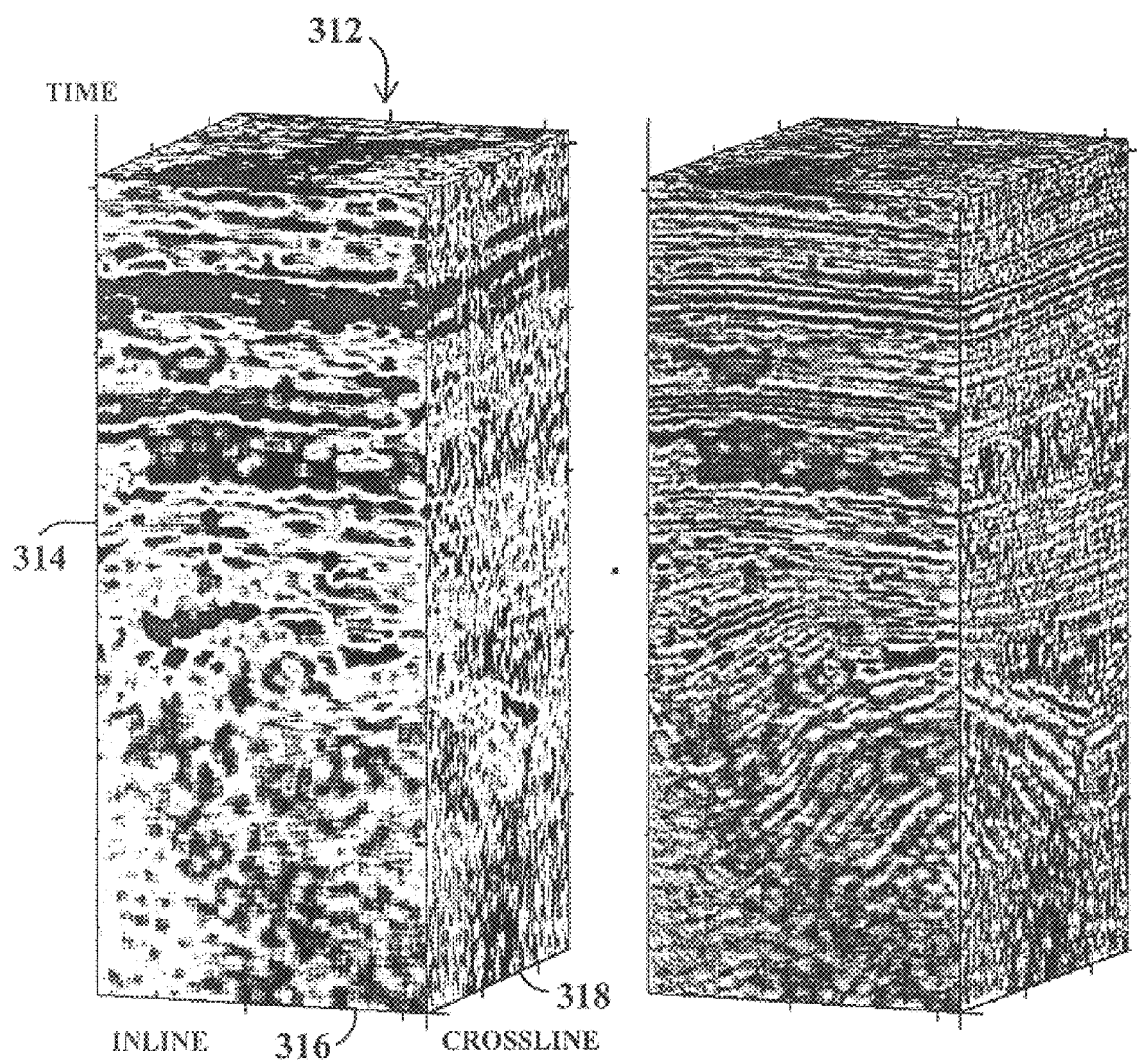
FIG. 3B shows an example of a contrast texture attribute volume wherein the left image is the data volume produced by the present invention and the right image is the overlay between the data volume of the left image and the input amplitude volume used to produce the data volume of the left image.
Figure 3C:
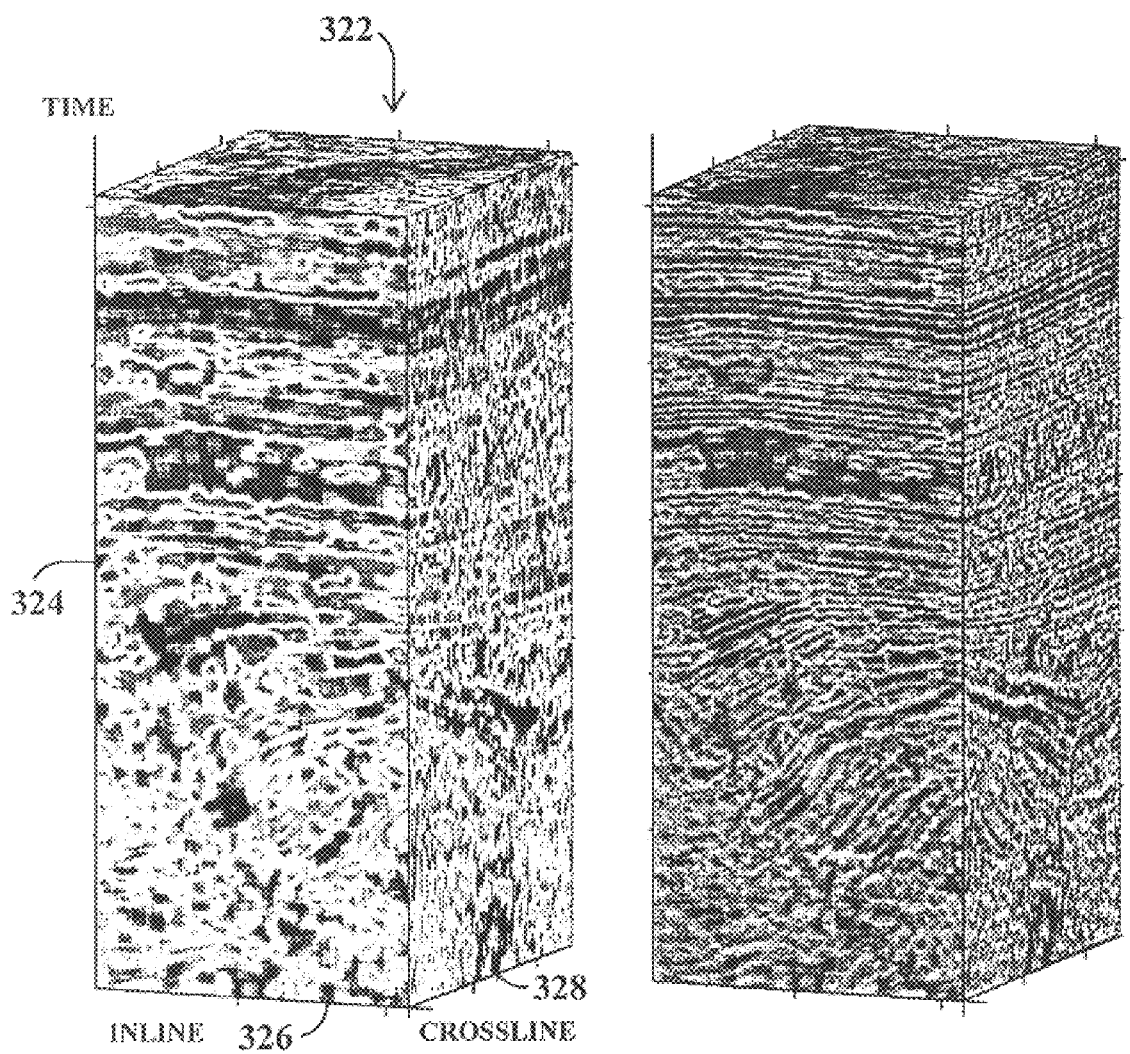
FIG. 3C shows an example of a randomness texture attribute volume wherein the left image is the data volume produced by the present invention and the right image is the overlay between the data volume of the left image and the input amplitude volume used to produce the data volume of the left image.
Figure 3D:
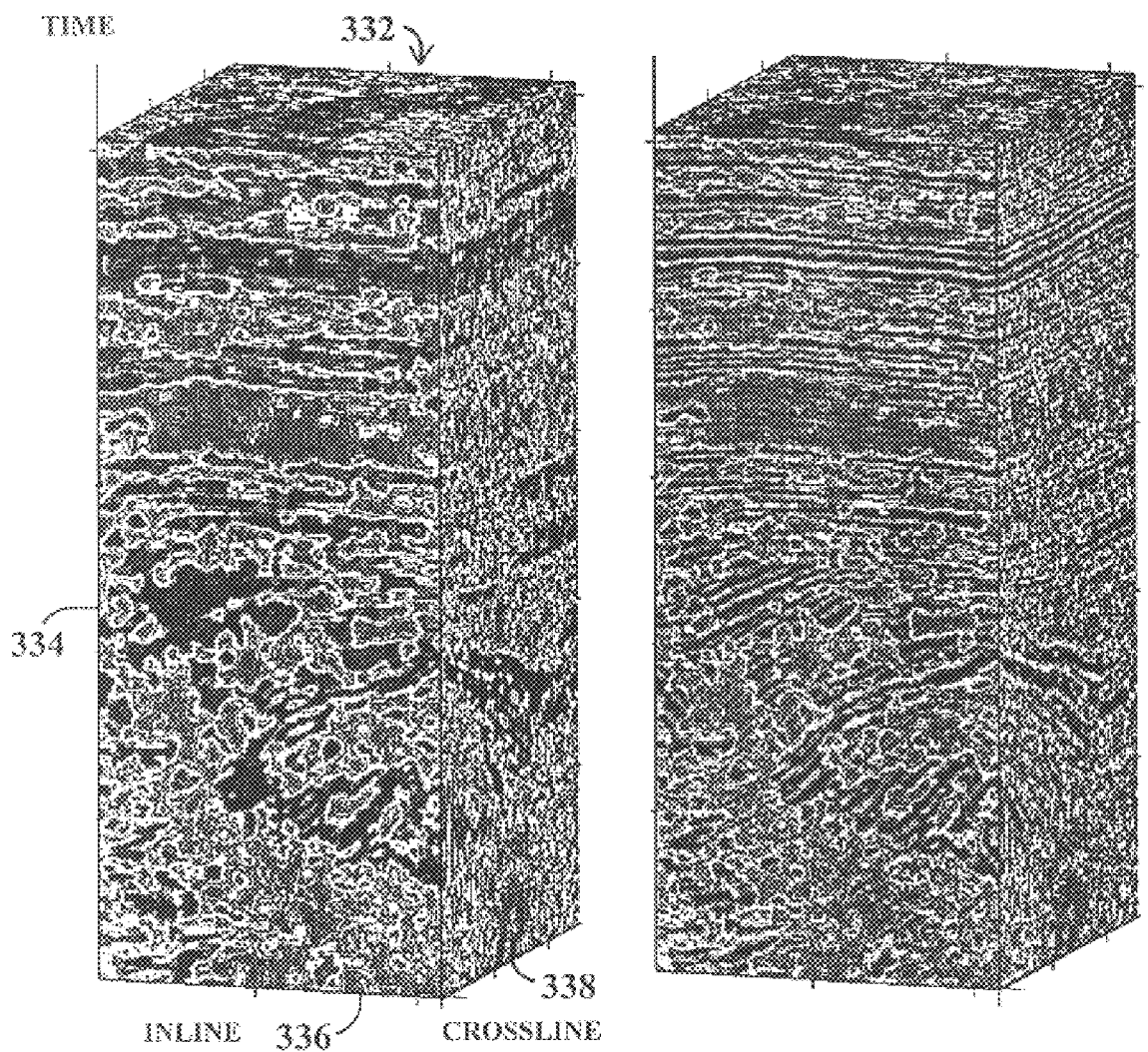
FIG. 3D shows an example of classification volume wherein the left image is the data volume produced by the present invention and the right image is the overlay between the data volume of the left image and the input amplitude volume used to produce the data volume of the left image.

FIGS. 3A–3D show examples of interpretation data produced by the seismic display and analysis software of the present invention. FIGS. 3A through 3D, all show data derived by the present invention from the seismic data of FIG. 2. FIG. 3A shows a texture attribute volume of homogeneity; FIG. 3B shows a texture attribute volume of contrast; and FIG. 3C shows a texture attribute volume of randomness. FIG. 3D shows an example of a classification volume. Each element of the interpretation data summarizes three dimensional textural information of a texel (defined below) using point-relational statistics.

To extract the data at a specific location within the seismic volume, the method uses an evaluation window comprising a finite number of neighboring voxels within the three-dimensional array of input data. This three-dimensional array of voxels is called a volume texture element or texel. As will be described below, a texel may take one of a number of different shapes, depending upon the type of data being evaluated.

Seismic texture is a complex function of locations in three dimensional space. The texture at each voxel location is evaluated by defining a texel around the voxel, with the voxel at the center of the texel, and calculating the texture attributes using all the surrounding voxels within the texel.

The voxels within the input data are processed sequentially throughout the input data volume wherein a texel is created dynamically around each voxel as it is processed. As a result, the input amplitude volume data is transformed into a VCM and then into several texture attributes, and these texture attributes are subsequently used as inputs into a classification method to produce a final interpretation volume.

The VCM seismic texture concept is different from, but inclusive of, the conventional attribute concept. The VCM and texture attributes focus on the distribution and ordering of all the voxels within a texel in different directions and scales to represent the internal complexities of reflection patterns. These textural complexities have not been captured by prior art conventional attributes that are generally evaluated using a single trace and/or an interpreted horizons. By changing the aspect ratio and size of the volume texel, the VCM concept can also be used to capture trace attributes and two dimensional textural attributes.

The VCM seismic texture analysis of the present invention is a volume processing technology that involves a texel cube. The VCM texture analysis is different from conventional seismic attribute analysis that is based on one single trace, or a limited number of traces. Thus, VCM seismic textures are relatively less sensitive to data noise and processing artifacts that sometimes cause significant problems in conventional attribute analysis. This advantage is a result of using more amplitude information to create the VCM than is used in creating conventional seismic attributes that use only one trace, for example instantaneous frequency, or that use a limited number of traces, for example coherence, geometric, and two dimensional texture attributes. A texel also includes more relevant and useful textural information than a single trace or a texel window. Thus, evaluating volume textures greatly reduces pitfalls of two dimensional processing and inspection, and thus are statistically more reliable.

VCM seismic textures can differentiate between seismic facies with different orientations in three dimensions. That is, they are sensitive to reflection geometry and able to detect anisotropy of seismic reflection patterns. VCM seismic textures can be evaluated along any arbitrary orientation. This is useful in identifying complicated reflection geometry in destructive depositional regimes such as inclined slumping facies in the vicinity of listric normal faults/slump escarpments or at stratigraphic sequence boundaries, and to enhance certain features such as the oblique or off-lapping reflection patterns. VCM seismic textures can be used to detect vertical faults and can be enhanced by evaluating the VCM textures along the horizontal direction (perpendicular to traces). Also, VCM seismic textures may show sub-horizontal detachment faults or listric faults, which may be overlooked by conventional trace-to-trace coherence attributes. The orientation sensitivity can either be enhanced or suppressed by changing the size and/or aspect ratio of the texel, depending on exploration objectives. For example, the external geometry, for example dip, azimuth, etc., of seismic reflection patterns can be enhanced by increasing texel size and aspect ratio between the horizontal (perpendicular to traces) to the vertical (parallel to traces) dimensions of the texel. Structural effects can be suppressed by reducing these two parameters, or even by changing the shape of the texel.

VCM seismic textures are more meaningful and intuitive in a geological sense than conventional seismic attributes. For example, high amplitude continuous facies, which are generally associated with marine shale deposits, have relatively low homogeneity, high contrast, and low randomness. Low amplitude discontinuous seismic facies, that are generally associated with massive sand or turbidite deposits, have high homogeneity, low contrast, and high randomness. Low frequency high amplitude anomalies, that generally indicate hydrocarbon accumulation, have high homogeneity, low contrast, and low randomness relative to those associated with normal stratigraphic boundaries. Inclined discontinuous facies, that may be associated with slumping facies in the vicinity of growth faults or at sequence boundaries that represent a destructive depositional environment, generally have different homogeneity, contrast, and randomness than the flat continuous facies that may have been formed in a stable tectonic setting, and a low-energy depositional environment. This correlation is due to the fact that different geological facies have characteristic internal amplitude configurations that can be better defined on a volume texture basis from a three dimensional perspective.

Volume textures derived from VCM texture technology using three dimensional texels have a much higher resolution than that produced using two dimensional texel windows. This advantage is due to the fact that characterization of seismic textures requires a sufficient number of voxels that, in the case of two dimensional texture analysis, can only be acquired by increasing the size of the texel window at the cost of decreasing seismic texture resolution. In contrast, VCM texture analysis solves this problem by adding the third dimension to the texel, resulting in a seismic texture volume with a much higher resolution.

Pattern recognition in three dimensions involves detailed computational analysis of all the voxels within the texel and generally requires comprehensive statistical analysis on a volume basis. Thus, volume-based texture analysis is computationally more intensive than single-trace based attributes analysis. In addition, the data volume processed is generally much larger than in horizon-based attribute analysis that involves only a very limited portion (a slice) of the whole volume. For these reasons, it takes longer time to extract VCM textures. However, the computational time varies with parameters such as volume size, texel size, and bit resolution. By changing and optimizing these variables, the computational efficiency can be significantly increased.

Figure 4:
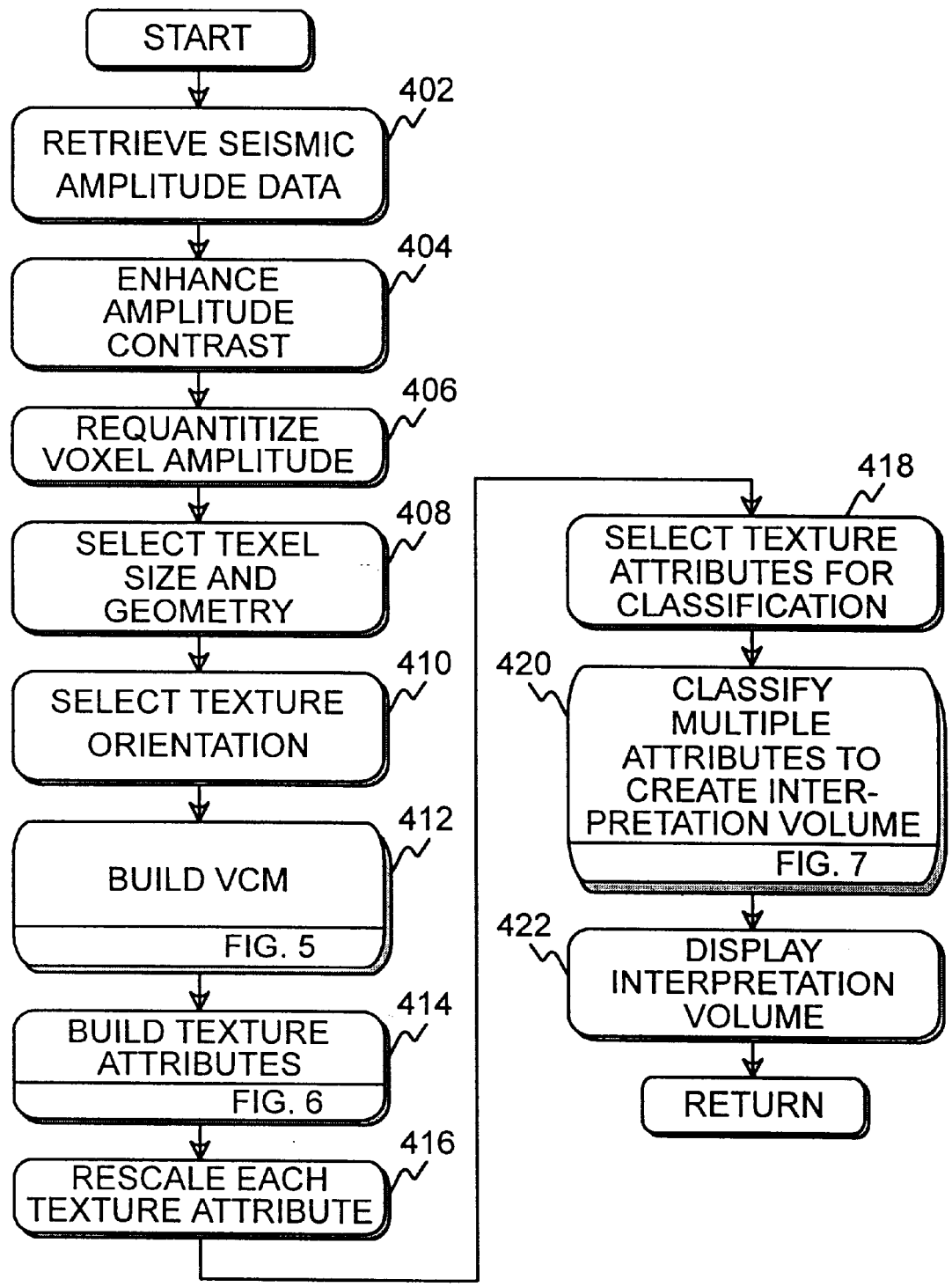
FIG. 4 shows a flowchart of the analysis software within the seismic display and analysis software of the present invention.

FIG. 4 shows a flowchart of the analysis software within the seismic display and analysis software of the present invention. The Seismic display and analysis software 120 (FIG. 1) performs user interface functions and calls the analysis software, flowcharted in FIG. 4, to perform an analysis of the seismic data.

Referring to FIG. 4, after entry, step 402 retrieves the seismic amplitude data from the storage device 112 (FIG. 1). In practice, the seismic amplitude data may be retrieved more than once, depending upon the processing being performed.

Step 404 enhances the amplitude contrast of the seismic amplitude data. Occasionally, the dynamic range of the seismic amplitude data is limited to a small portion of the available maximum dynamic range available, for example for 8-bit resolution, the maximum dynamic range available is from 0 to 255, but the data values may extend over only a portion of this range, thus limiting the identification of texture information. To enhance textural information and to increase the subsequent texture resolution, pre-texture contrast enhancement is performed to maximize information on textural properties of the amplitude volume. This step is optional, depending upon the data. This type of contrast enhancement is conventional and well known in the art.

Step 406 requantitizes the amplitudes of the voxels within the seismic amplitude data to increase the spatial resolution, to reduce the computational expense for subsequent texture extraction, and to increase the signal-to-noise ratio. In the preferred embodiment the bit resolution is changed to 4 bits to reduce noise, and to increase computational efficiency, while maintaining a satisfactory capacity to identify and differentiate typical reflection patterns.

Figure 5:
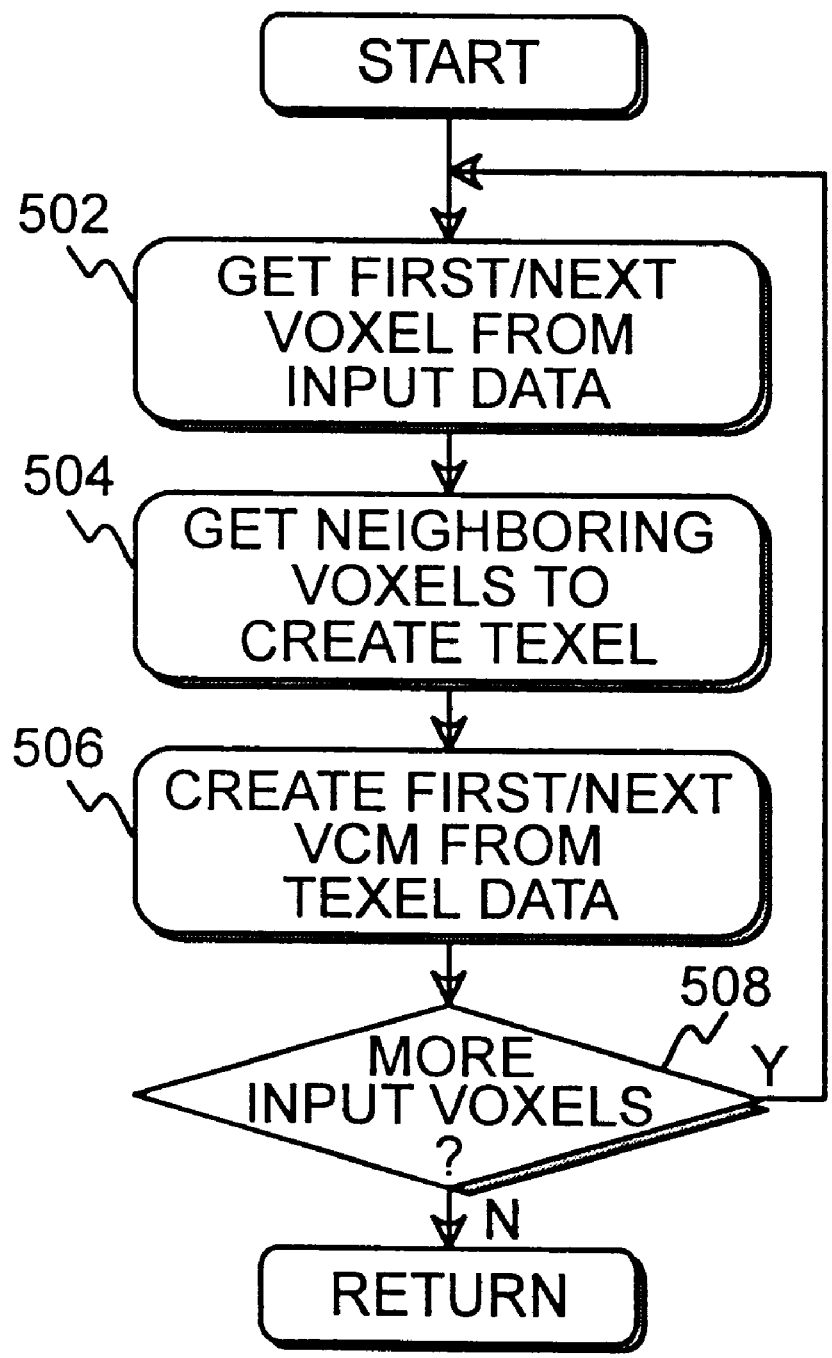
FIG. 5 shows a flowchart of the build VCM process called from FIG. 4.

Step 408 calls FIG. 5 to select the texel size and geometry. The size of a texel is defined as the number of the voxels contained within the texel. The number of voxels is a requirement of the number of the inlines and crosslines, and the number of the samples along the trace that are included within the texel. Typically the texel size has to be more than the bit resolution squared to be statistically meaningful. For example, if the requantized bit resolution is 4 bit (16 bins), the texel size has to be $16^2$.

The texel geometry refers to the aspect ratio of the texel which includes the following representative cases:

(a) Cube, where the three dimensions of the texel are equal. This provides textural information sufficient along all the three orientations, but spatial resolution is low and computational cost is high with a cube. This geometry is typically employed for seismic facies classification, for example a texel size of 9 by 9 by 9, and for fault and discontinuity detection, for example a texel size of 3 by 3 by 3.

(b) Horizontal slab, where the x and y dimensions of the texel are much greater that the z dimension, for example a size of x=9 by y=9 by z=3. This type of texel might be used for anticline, monocline, and slumping facies detection.

(c) Horizontal column, where the z and x dimensions are much less than the y dimension, for example x=3, y=9 and z=3, or the z and y dimensions are much less than x, for example x=9, y=3, z=3.

(d) Vertical slab, where the z and x dimensions are much greater than the y dimension, or the z and y dimensions are much greater than the x dimension.

(e) Vertical column where the z dimension is much greater than the x and y dimensions. This type of texel provides the best textural information along traces, with horizontal resolution being high and structural effect being low. For example x=5, y=5 and z=9.

(f) Single trace, where the x and y dimensions are equal to one and the z dimension is much greater than one. This type of texel is used for trace-shape analysis such as curvature, frequency, roughness, and any other trace attributes.

Different geometry of texels can be designed to highlight and to emphasize different aspects of seismic reflection patterns. For example, a flat slab texel geometry emphasizes the lateral (in the inline and crossline direction) variation in seismic reflection patterns, however trace shape characteristics may not be captured by this texel geometry. Vertical slab texel geometry tends to emphasize the textural variation in the inline or crossline direction, and is equivalent to two dimensional processing as used in conventional image analysis. Vertical column texel geometry emphasizes the shape of traces but not the lateral variation of the traces.

Step 410 selects the texture orientation. Texture orientation is the alignment of the voxel couple within the texel along which the VCM textures are typically evaluated. This can be any arbitrary direction within the texel. Typically, the voxel couples are oriented perpendicular and parallel to traces. By evaluating seismic textures along different orientations, the present invention can capture anisotropy of seismic reflection patterns. The orientation sensitivity is particularly useful for identifying complicated structural and stratigraphic features in the subsurface.

Step 412 calls FIG. 5 to build the VCM. Step 414 then calls FIG. 6 to construct the texture attributes.

After the texture attributes are constructed, step 416 rescales each texture attribute and maps the attribute to colors. It is necessary to rescale the calculated texture attribute data because the texture attributes may not be displayable at the available bit resolution of the system. To rescale the texture attribute data, which typically varies from 0 to 1, each voxel of the texture data volume is mapped to the dynamic range desired, for example, 0–255 for 8-bit resolution. In the preferred embodiment, the spatial relationship and variation of textures is displayed by mapping the attribute values at each voxel location to distinctive colors, which is similar to the color display of conventional seismic attributes.

After the texture attributes are rescaled, the number of the attribute volumes used for classification must be selected. Although all the volumes could be used, it is desirable to select the best and most economic combination of texture volumes as input for classification. This is done by cross correlating and selecting the least correlated volumes.

The cross plot of various attributes volumes were constructed in three dimensions with the three axes representing three different attributes. This three dimensional display has many advantages over the conventional two dimensional scattergrams. In place of the graphical display of the three dimensional cross plot, the redundancy of the texture information can also be evaluated by calculating the covariance matrix among all the extracted texture attributes. From this evaluation, the least correlated texture attribute volumes are selected as input into the subsequent classification algorithm.

Figure 7:
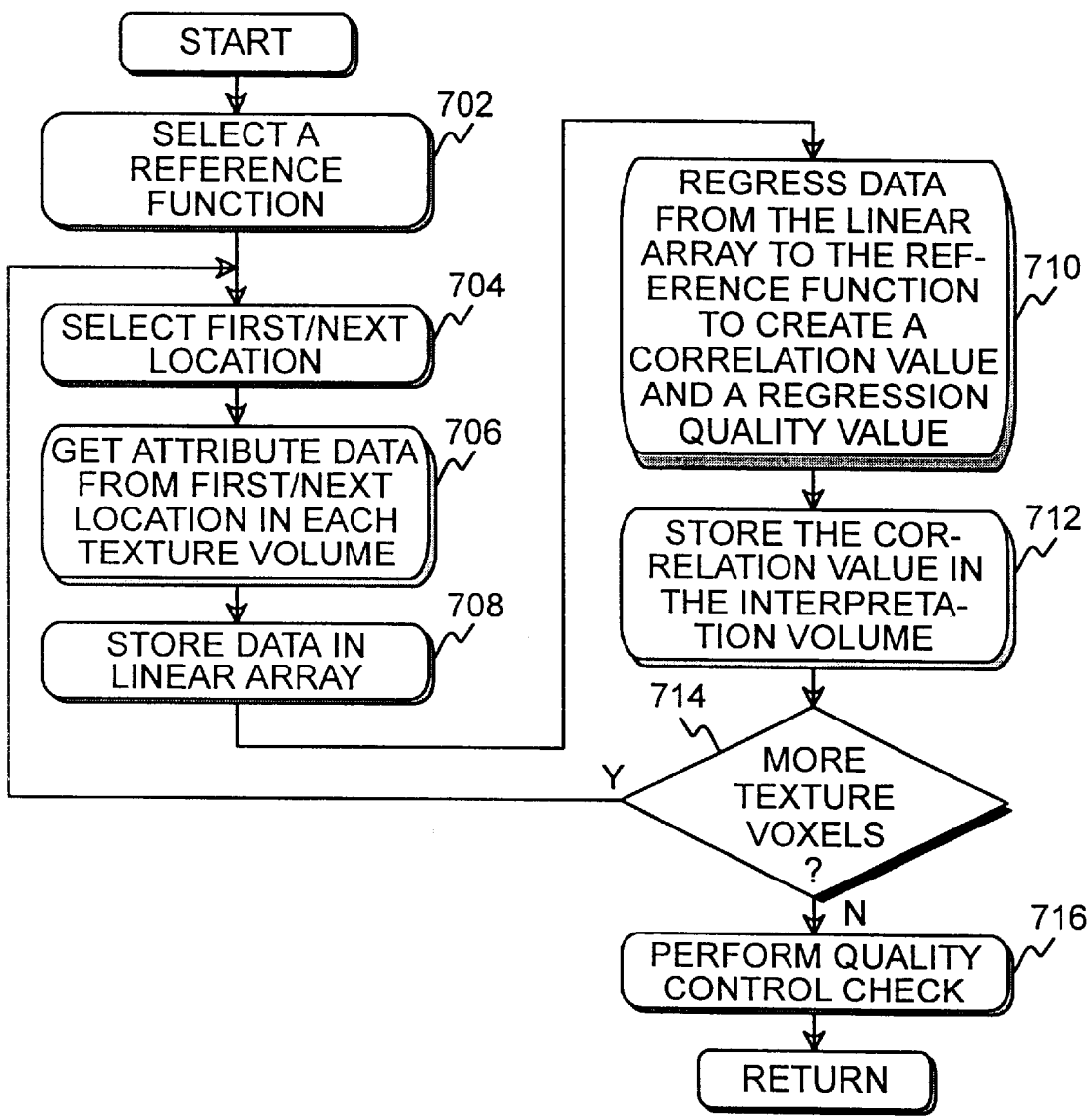
FIG. 7 shows a flowchart of the classify and build interpretation volume process called from FIG. 4.
Figure 8:
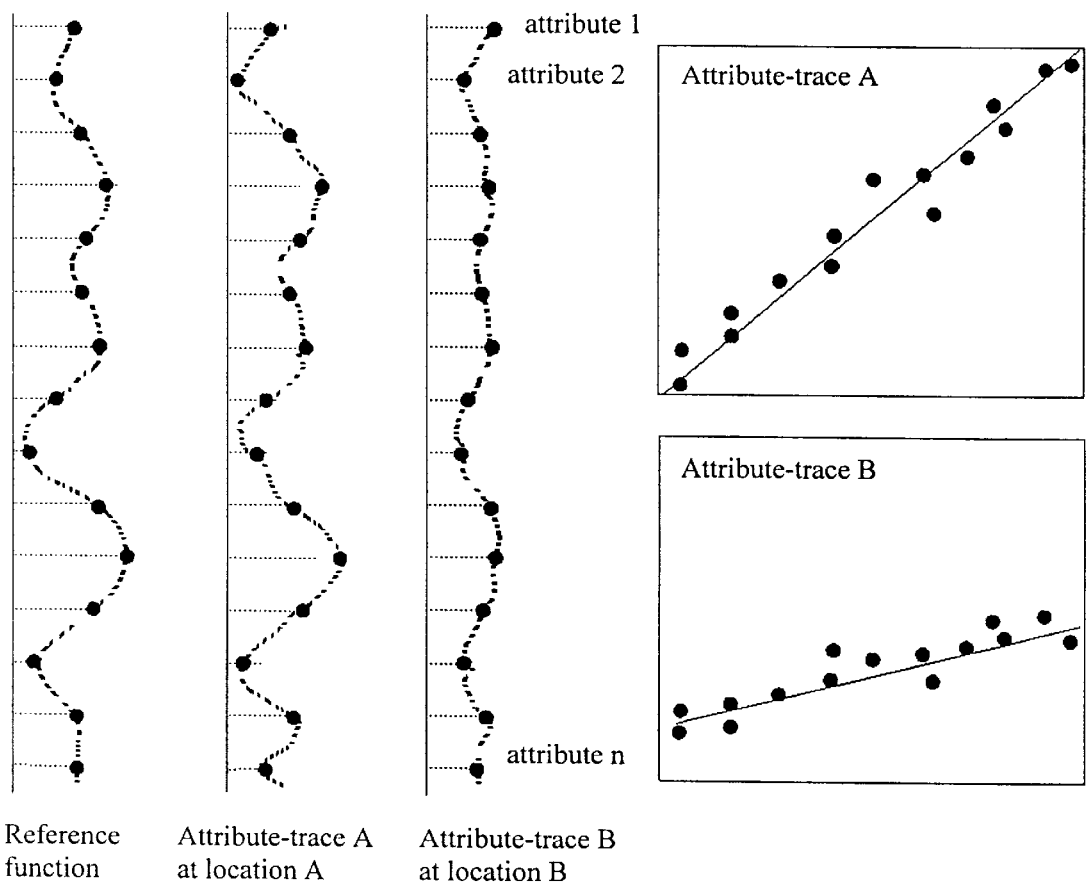
FIG. 8 shows a regression analysis between attribute-trace and a reference function.

After selecting the texture attributes, step 420 calls FIG. 7 to classify the data and create the interpretation volume. Step 422 then displays the interpretation volume on the display 110 (FIG. 1).

FIG. 5 shows a flowchart of the build VCM called from step 412 of FIG. 4. Referring to FIG. 5, after entry, step 502 gets the first, or next, voxel from the input data. Step 504 gets the neighboring voxels in the input data that are needed to create the texel, that was defined in step 408 of FIG. 4. Step 506 creates the first, or next output VCM.

The elements of the VCM represent the number of the voxel couples that have a specified amplitude pair within the texel. For example, one might set the element at the ith row and jth column of the VCM to the number of times that an input voxel with amplitude i is neighbored by an input voxel with amplitude j, that is, the number of the i–j voxel couples within the texel.

As a more concrete example, the texel size and orientation could be defined such that a 6 in row 1 and column 2 of the output VCM would indicate that within the input texel there are a total of six voxel couples wherein one voxel of the couple has an amplitude of 1 and this voxel is neighbored by a voxel having an amplitude of 2 along the specified direction within the texel of a given size.

A VCM is always associated with a certain orientation relative to the seismic traces in three dimensions, which can be:

(a) Vertical (along traces)

(b) Horizontal (orthogonal to traces)

(c) Other (oblique to traces)

Typically, at least three VCMs need to be evaluated along three different orientations for each texel.

Step 508 determines whether there more input voxels to be evaluated. If so, step 508 goes back to step 502 to get the next voxel. After all voxels have been evaluated, step 508 returns to FIG. 4.

Figure 6:
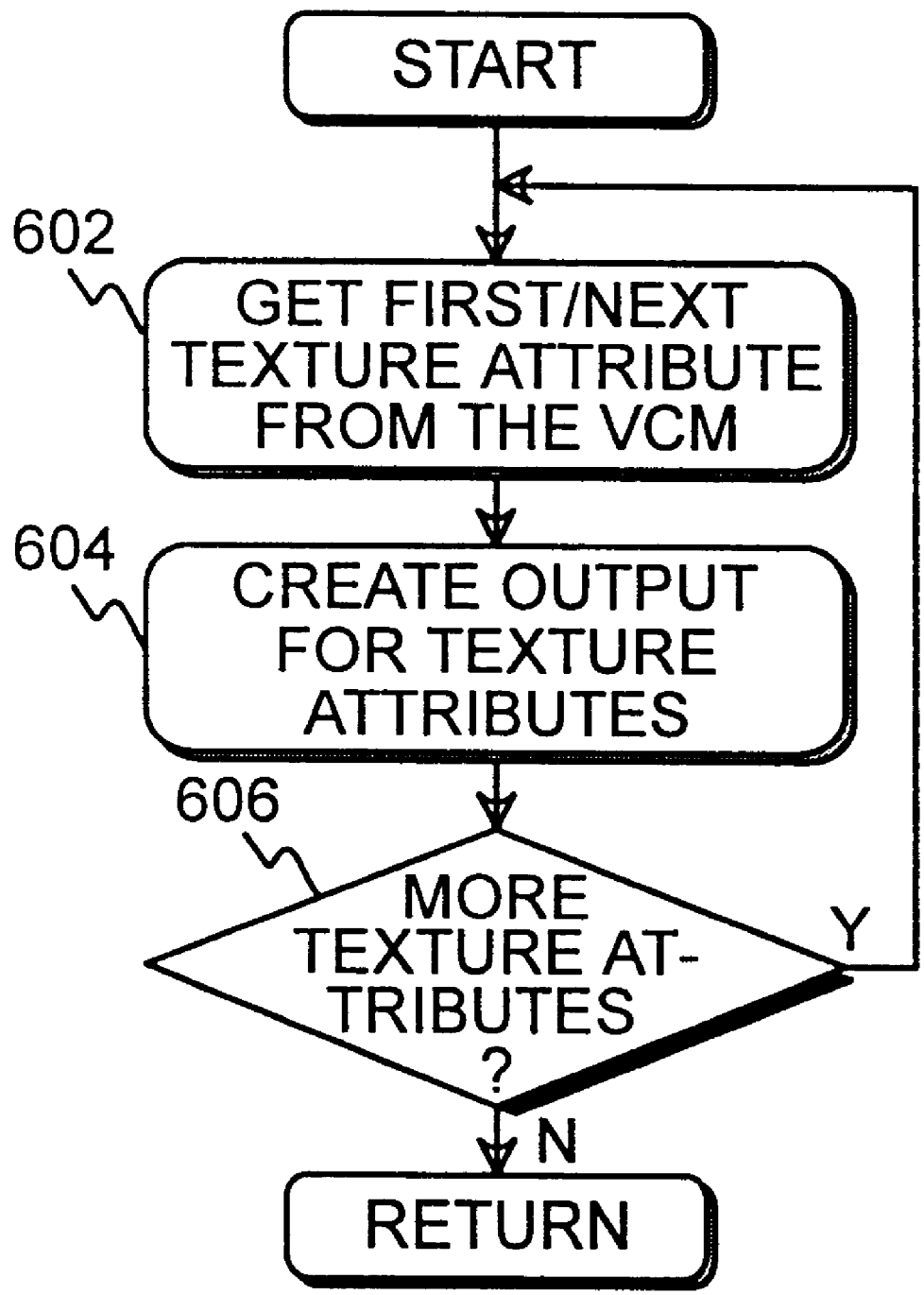
FIG. 6 shows a flowchart of the process of creating texture attribute volumes from the VCM which is called from FIG. 4.

FIG. 6 shows a flowchart of the process of creating the texture attributes from the VCM.

The VCM is a tabular representation of the spatial relationship of the spatially associated voxels within the texels of the input seismic data. To quantitatively and graphically represent the texture information, several texture attribute volumes are created from the VCM, using different methods, wherein each attribute volume created represents a specific aspect of the seismic textures in consideration.

For example, summation of each entry squared of the VCM results in an attribute that represents the textural homogeneity of the seismic reflection pattern in consideration. Similarly, by using the formula in the following examples, texture contrast and randomness of the seismic reflection pattern in consideration can be calculated and these represent the local variation and predictability of the voxel amplitude relative to each other within the texel.

$$\text{Homogeneity} = \sum_{i=1}^{N}\sum_{j=1}^{N} k(i,j)^2$$

$$\text{Contrast} = \sum_{n=0}^{N-1} k(i,j) n^2 \left[ \sum_{i=1}^{N}\sum_{j=1}^{N} k(i,j) \Big|_{|i-j|=n} \right]$$

$$\text{Randomness} = -\sum_{i=1}^{N}\sum_{j=1}^{N} k(i,j) \log[k(i,j)]$$

where k(i, j) represents the element of the VCM at ith row and jth column. N denotes the number of the rows/columns of the VCM.

Referring to FIG. 6, after entry, step 602 gets the first or next value from the VCM. Step 604 creates an output value in the texture attribute volume using one of the equations, for example homogeneity, contrast, or randomness shown above. Although many other equations could also be used to create any number of texture attributes, these three equations are the most representative of characterizing typical seismic features.

Step 606 then determines whether there are additional texture attributes to calculate, and if so, step 606 transfers back to step 602 to calculate and create the output value for the next texture attribute volume. After the output values in all texture attribute volumes have been calculated for this voxel location, step 606 returns to FIG. 4.

FIG. 7 shows a flowchart of the classify multiple textural attributes using the attribute-trace method, and build interpretation volume process called from step 416 of FIG. 4.

In classifying the data, the present invention combines multiple textural attributes into an attribute-trace to provide a useful means of minimizing the non-uniqueness and maximizing efficiency and reliability in seismic attribute interpretation. An attribute-trace is defined as a one-dimensional array of heterogeneous attribute samples each representing a different attribute associated with a voxel of input seismic data. Thus an attribute-trace is different from seismic traces that consist of amplitude samples along the vertical time axis as commonly observed on seismic lines. A combination of any number of multiple attributes in multiple attribute space can be conceptually represented by a single attribute-trace, and a single attribute-trace is much easier to manipulate and classify than multiple attributes. As more attributes are included in an attribute-trace, the attribute-trace becomes longer, to provide higher resolution to help discriminate between seismic features.

Referring to FIG. 7, after entry, step 702 selects a reference function. Typically, the reference function is defined as a simple mathematical function, such as sinx or cosx, etc., or defined using attributes at an arbitrary location or at a well location.

After selecting a reference function, step 704 sets the first, or next, voxel location to be classified. Step 706 retrieves all the voxel data from all texture attribute volumes at the location set in step 704 and step 708 stores these attributes into a linear array, called an attribute-trace.

Step 710 classifies the attribute-trace. The classification is performed by regressing the data from the attribute-trace to the reference function. The slope of the resulting regression line, calculated as correlation coefficient γ is the correlation value that defines how well the single attribute-trace data is correlated to the reference function. The equation for α is:

$$\alpha = \sum_{i=1}^{n}(x_i-\bar{x})(y_i-\bar{y}) \Big/ \sum_{i=1}^{n}(x_i-\bar{x})^2$$

where n is the number of attributes, and "$\bar{x}$" and "$\bar{y}$" denote the mean values of the attribute-trace ($x_i$) and the reference function ($y_i$), respectively.

This results in a value between −1 and 1, wherein values closer to 1 indicate a good correlation between the attribute-trace and the reference trace. Values closer to 0 indicate low correlation between the attribute-trace and the reference trace. Values closer to −1 indicate reverse correlation.

After determining the correlation value, step 712 stores the correlation value in the interpretation volume at the location set in step 704. This location in the output interpretation volume is the same one as the input texture attribute volumes. Step 714 determines whether there are more locations to process, and if so, step 714 returns to step 704 to process the next location.

After all locations have been processed, and their correlation values stored, step 714 goes to step 716 which performs a quality control check. This quality control check is performed by calculating vertical offset (σ) of the regression line and average distance (β) between the scattered data points and the regression line. The following equations are used to calculate the parameters:

$$\beta = \frac{1}{n}\sum [y_i - \bar{y} - \alpha(x_i - \bar{x})]^2$$

where n is the number of attributes, and "$\bar{x}$" and "$\bar{y}$" represent the mean values of the attribute trace ($x_i$) and the reference function ($y_i$), respectively.

After preforming the quality control check, step 716 returns to FIG. 4.

This attribute-trace regression method differs from the conventional classification methods, such as clustering analysis, that group different categories of attribute clusters based on their closeness in attribute classification space. The attribute-trace regression method allows any meaningful number of classes to be identified interactively without repeatedly running the same classification algorithm with different class numbers, as is usually done with clustering or NNT-based classification. Also, using attribute-trace regression, attribute calibration and validation can be performed interactively by adjusting the reference trace using attributes at the well location. Therefore, the attribute-trace regression method provides a means of unifying conventional clustering (unsupervised) and supervised classification and quality check into one single process, thus significantly simplifying the workflow for image interpretation and multi-attribute classification.

Because the attribute-trace regression method does not require a user-defined number of classes, it significantly increases the efficiency of interpretation and the reliability and resolution of the resulting thematic volume. Finally, intrinsic clustering and discriminability may be readily recognized based on the histogram of the regression coefficient volume, which provides an objective, meaningful basis for an informed interpretation that is impossible within conventional multiple attribute classification space.

Having thus described a presently preferred embodiment of the present invention, it will now be appreciated that the aspects of the invention have been fully achieved, and it will be understood by those skilled in the art that many changes in construction and widely differing embodiments and applications of the invention will suggest themselves without departing from the present invention. The disclosures and the description herein are intended to be illustrative and are not in any sense limiting of the invention, more preferably defined in scope by the following claims.

What is claimed is:

1. A method for analyzing and displaying three dimensional data, said method comprising the steps of:
    (a) selecting an evaluation window;
    (b) selecting a location within said three dimensional data;
    (c) selecting data from all locations around said location selected in step (b) that are contained within said evaluation window;
    (d) determining an output data value from said data selected in step (c);
    (e) storing said output data value in a voxel coupling matrix;
    (f) selecting at least one method for converting data from said voxel coupling matrix to texture attributes;
    (g) determining an output attribute data value from said method selected in step (f);
    (h) storing said output attribute data value in a texture attribute volume at a location identical to said location selected in step (b), wherein said texture attribute volume contains data determined by a single method selected in step (g);
    (i) repeating steps (g) through (h) for each method selected in step (f);
    (j) repeating steps (h) through (k) for each location within said three dimensional data;
    (k) selecting a location within a first of said texture attribute volumes created in steps (f) through (j);
    (l) selecting attribute data from each of said texture attribute volumes at said location selected in step (k);
    (m) classifying said attribute data selected in step (l) to create a classified data value;
    (n) storing said classified data value in an interpretation volume at a location identical to said location selected in step (k);
    (o) repeating steps (l) through (n) for each location within said first of said texture attribute volumes; and
    (p) displaying said interpretation volume on a display device.

2. The method of claim 1 wherein step (a) further comprises the steps of:
    (a1) selecting a size of said evaluation window; and
    (a2) selecting a geometry of said evaluation window.

3. The method of claim 2 wherein said geometry comprises a cube having x, y, and z dimensions equal.

4. The method of claim 2 wherein said geometry comprises a horizontal slab with x and y dimensions equal and greater than a z dimension.

5. The method of claim 2 wherein said geometry comprises a horizontal column having z and x dimensions equal and less than a y dimension.

6. The method of claim 2 wherein said geometry comprises a horizontal column having z and y dimensions equal and less than an x dimension.

7. The method of claim 2 wherein said geometry comprises a vertical slab having z and x dimensions equal and greater than a y dimension.

8. The method of claim 2 wherein said geometry comprises a vertical slab having z and y dimensions equal and greater than an x dimension.

9. The method of claim 2 wherein said geometry comprises a vertical column having x and y dimensions equal and less than a z dimension.

10. The method of claim 2 wherein said geometry comprises a single trace having x and y dimensions equal to one and less than a z dimension.

11. The method of claim 2 further comprising the following step performed before step (a):
    (a0) reducing a number of bits of each amplitude value of said three dimensional data to a predetermined number of bits.

12. The method of claim 11 wherein step (a1) further comprises the step:
    (a1a) selecting a size of said evaluation window to be substantially equal to a square of a size of said reduced number of bits.

13. The method of claim 1 wherein step (d) further comprises the steps of:
    (d1) selecting a first data value from a first location selected in step (c);
    (d2) selecting a second data value from a second location selected in step (c) wherein said second location differs from said first location;
    (d3) when said first data value has a predefined relationship to said second data value, adding one to a count;
    (d4) repeating steps (d2) and (d3) for each location selected in step (c) that differs from said first location;
    (d5) repeating steps (d2) through (d4) for each location selected in step (c);
    (d6) storing said count as said output data value.

14. The method of claim 1 wherein step (f) further comprises the following step (f1) and wherein step (g) further comprises the following step (g1):
    (f1) selecting an equation to create homogeneity values in said texture data;
    (g1) applying said equation selected in step (g1) to said voxel coupling matrix to determine said output data value.

15. The method of claim 1 wherein step (f) further comprises the following step (f1) and wherein step (g) further comprises the following step (g1):
    (f1) selecting an equation to create contrast values in said texture data;
    (f1) applying said equation selected in step (g1) to said voxel coupling matrix to determine said output data value.

16. The method of claim 1 wherein step (f) further comprises the following step (f1) and wherein step (g) further comprises the following step (g1):
    (f1) selecting an equation to create randomness values in said texture data; and
    (g1) applying said equation selected in step (g1) to said voxel coupling matrix to determine said output data value.

17. The method of claim 1 wherein the following step (l1) is performed after step (l) and before step (m), and wherein step (m) further comprises the following step (m1):
    (l1) selecting a reference function; and
    (m1) regressing said data selected in step (n) to said reference function selected in step (m1) to create a correlation of regression as said classified data value.

18. The method of claim 1 wherein step (p) comprises the steps of:
    (p1) determining a quality value of said classified data values in said interpretation volume; and (p2) displaying said interpretation volume and said quality value on said display device.

19. The method of claim 1 wherein the following step (a1) is performed after step (a) and before step (b):
   (a1) enhancing a contrast of each voxel of said three dimensional data.

20. A method for classifying seismic data, said method comprising the steps of:
   (a) converting said seismic data into a plurality of seismic texture attribute data arrays;
   (b) selecting a reference function;
   (c) selecting a location within a first of said seismic texture attribute data arrays;
   (d) selecting data from each of said seismic texture attribute data arrays at said location selected in step (c);
   (e) regressing said data selected in step (d) to said reference function selected in step (b) to create a correlation of regression;
   (f) storing said correlation of regression value in an output classification volume at a location identical to said location selected in step (c);
   (g) repeating steps (c) through (f) for each location within said first of said seismic texture attribute volumes; and
   (h) displaying said output classification array on a display device.

21. The method of claim 20 wherein step (e) further comprises the following step (e1) and step (h) further comprises the following step (h1):
   (e1) determining a regression quality value corresponding to in said output classification value; and
   (h1) displaying said regression quality value on said display device.

* * * * *